US012631306B2

(12) United States Patent
Jung et al.

(10) Patent No.: US 12,631,306 B2
(45) Date of Patent: May 19, 2026

(54) LAMP FOR VEHICLE

(71) Applicant: SL Corporation, Daegu (KR)

(72) Inventors: Jin Young Jung, Gyeongsan-si (KR); Jun Tae Kim, Gyeongsan-si (KR)

(73) Assignee: SL Corporation, Daegu (KR)

(*) Notice: Subject to any disclaimer, the term of this patent is extended or adjusted under 35 U.S.C. 154(b) by 0 days.

(21) Appl. No.: 19/073,193

(22) Filed: Mar. 7, 2025

(65) Prior Publication Data

US 2025/0334241 A1 Oct. 30, 2025

(30) Foreign Application Priority Data

Mar. 12, 2024 (KR) ........................ 10-2024-0034532

(51) Int. Cl.
*F21S 41/24* (2018.01)
*F21S 41/20* (2018.01)

(52) U.S. Cl.
CPC ............ *F21S 41/24* (2018.01); *F21S 41/285* (2018.01)

(58) Field of Classification Search
CPC .......... F21S 41/24; F21S 41/285; F21S 41/43; F21S 41/18; F21S 41/143; F21S 41/27; F21S 41/321; F21S 41/275
See application file for complete search history.

(56) References Cited

U.S. PATENT DOCUMENTS

2003/0202359 A1* 10/2003 Albou ..................... F21V 13/04 362/514
2007/0183164 A1* 8/2007 Naganawa ............ F21S 41/155 362/545

FOREIGN PATENT DOCUMENTS

DE 202022103847 U1 * 8/2022 .............. F21S 41/24
KR 20220133529 A * 10/2022 .............. F21S 41/40

OTHER PUBLICATIONS

Search English translation of DE 202022103847 U1 (Year: 2022).*
Search English translation of KR 20220133529 A (Year: 2022).*

* cited by examiner

*Primary Examiner* — Omar Rojas Cadima
(74) *Attorney, Agent, or Firm* — United One Law Group LLC; Kongsik Kim; Jhongwoo Peck

(57) ABSTRACT

A lamp for the vehicle includes a plurality of light sources arranged in a vertical direction; and a plurality of light guiding lenses respectively disposed in front of the plurality of light sources and arranged in an arrangement direction of the plurality of light sources. Each of the plurality of light guiding lenses includes: a light receiving portion to which light emitted from a corresponding light source is incident; a light emission portion disposed in front of the light receiving portion to emit the light incident from the light receiving portion; and a shield portion including an edge portion disposed at a rear focus of the light emission portion. The edge portion is configured to obstruct a portion of the light from being directed to the light emission portion, and edge portions of at least two of the plurality of light guiding lenses have different orientation angles.

9 Claims, 18 Drawing Sheets

1

LAMP FOR VEHICLE

CROSS-REFERENCE TO RELATED APPLICATION

This application claims priority from Korean Patent Application No. 10-2024-0034532 filed on Mar. 12, 2024, which is incorporated herein by reference in its entirety.

BACKGROUND

1. Technical Field

The present disclosure relates to a lamp for a vehicle, and more particularly, to a lamp for a vehicle capable of generating an optimal beam pattern while implementing a slim form factor.

2. Description of Related Art

In general, a vehicle is provided with various lamps having an illumination function to allow the driver to more easily identify an object located around the vehicle during low-light conditions (e.g., night-time driving) and a signaling function for notifying a surrounding vehicle or a pedestrian of a driving state of the vehicle.

For example, a headlamp and a fog lamp are mainly used for the illumination functions, and a turn signal lamp, a tail lamp, and a brake lamp are mainly used for the signaling functions. In this regard, each of the lamps is stipulated by law in its installation standards and specifications so that each lamp can fully perform each function.

Recently, not only the functional aspect of helping safe driving by enabling the driver to secure visibility as the basic role of lamp for the vehicles, but also the aesthetic aspect that consumers feel through the improvement of outer appearance design has a great influence on the consumers' purchase decision.

To this end, research has been actively conducted to allow the lamp for the vehicle to be able to form the optimal beam pattern while having a slimmer outer appearance design.

SUMMARY

A purpose to be achieved by the present disclosure is to provide a lamp for a vehicle, in which when light beams emitted from a plurality of light sources are emitted through a plurality of light guiding lenses to form a beam pattern, a formation angle of an edge portion formed to form a cut-off line in each of the plurality of light guiding lenses is adjusted such that the cut-off line of the beam pattern formed by the light emitted through each of the plurality of light guiding lenses is formed at a correct position even when the positions of the plurality of light guiding lenses are different from each other.

The technical purposes of the present disclosure are not limited to those mentioned above, and other technical purposes not mentioned may be clearly understood by those skilled in the art from descriptions as set forth below.

In order to achieve the above purpose, a lamp for a vehicle according to an embodiment of the present disclosure may include a plurality of light sources arranged in a vertical direction; and a plurality of light guiding lenses respectively disposed in front of the plurality of light sources and arranged in the arrangement direction of the plurality of light sources. Each of the plurality of light guiding lenses may include a light receiving portion to which light emitted from a corresponding light source among the plurality of light sources is incident; a light emission portion disposed in front of the light receiving portion so as to emit the light incident thereto from the light receiving portion; and a shield portion including an edge portion disposed at a rear focus of the light emission portion. The edge portion may be configured to obstruct a portion of the light from being directed to the light emission portion, and edge portions of at least two of the plurality of light guiding lenses may have different orientation angles with respect to one another at which the edge portions extend.

One of the plurality of light guiding lenses may have the edge portion that extends in parallel to a horizontal line, and another of the plurality of light guiding lenses may have the edge portion that extends in an inclined manner at a predetermined angle with respect to the horizontal line.

The plurality of light guiding lenses may be arranged along the vertical direction, with positions thereof progressively shifting closer to one side in a left-right direction as they ascend.

The plurality of light guiding lenses may include a first light guiding lens; a second light guiding lens disposed on top of the first light guiding lens; and a third light guiding lens disposed under the first light guiding lens. The edge portion of the first light guiding lens may extend in parallel with the horizontal line. The edge portions of the second light guiding lens and the third light guiding lens may extend in an inclined manner in opposite directions with respect to each other. Each of the second light guiding lens and the third light guiding lens may have both opposing ends in the left-right direction of the edge portion. One of the both opposing ends may be disposed closer to the first light guiding lens than the other, and one of the both opposing ends may have a higher vertical level than the other. As each of the second light guiding lens and the third light guiding lens is spaced from the first light guiding lens in the left-right direction by a greater spacing, the edge portion thereof may extend in an inclined manner at a greater angle with respect to a reference line parallel to the horizontal line Each of the plurality of light guiding lenses and each of the plurality of optical lenses corresponding to each other may share a common focus. The common focus may be formed by the light emission portion of the light guiding lens and a light receiving surface of the optical lens corresponding to each other.

The specific details of other embodiments are included in the detailed description and drawings.

According to the lamp for the vehicle of the present disclosure as described above, one or more of the following effects are provided.

Even when the positions of the plurality of light guiding lenses are different from one another, the cut-off line of the beam pattern formed by the light emitted from each of the plurality of light guiding lenses may extend in parallel to the horizontal line by adjusting the angle at which the edge portion of each of the plurality of light guiding lenses are inclined. This configuration may prevent glare potentially occurring for a driver of a vehicle ahead of the vehicle of interest or deterioration in the field of view in front of the vehicle, which may be caused when the cut-off line of the beam pattern formed by the light emitted from at least one of the plurality of light guiding lenses is inclined at a non-zero angle with respect to the reference line parallel to the horizontal line due to the difference between the positions of the plurality of light guiding lenses.

The effects of the present disclosure are not limited to those mentioned above, and other effects not mentioned will be clearly understood by those skilled in the art from the present disclosure.

BRIEF DESCRIPTION OF THE DRAWINGS

The above and other aspects and features of the present disclosure will become more apparent by describing in detail illustrative embodiments thereof with reference to the attached drawings, in which.

DETAILED DESCRIPTIONS

Figure 1:
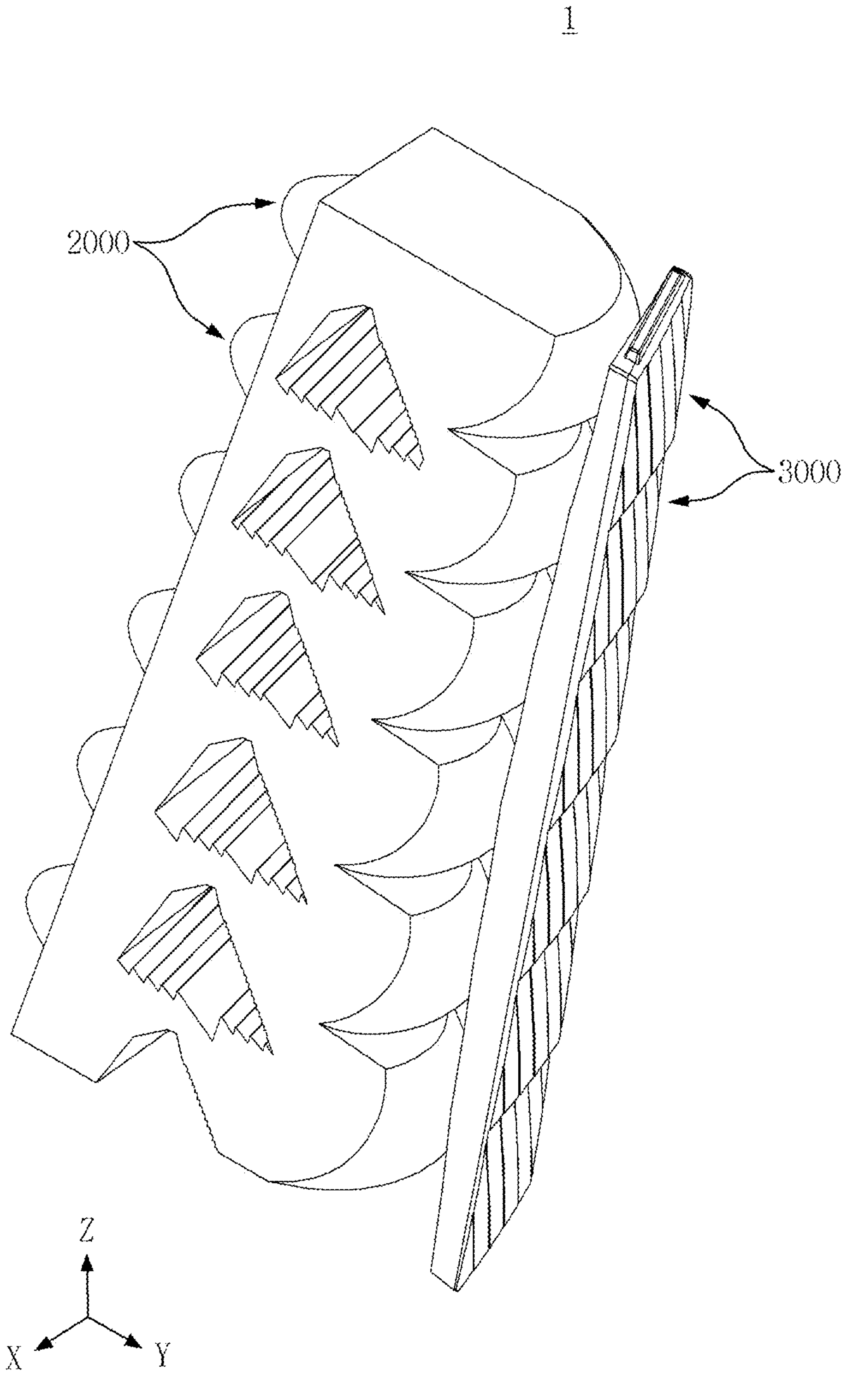
FIGS. 1 and 2 are perspective views showing a lamp for a vehicle according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to drawings for illustrating a lamp for a vehicle according to some embodiments of the present disclosure.

Figure 2:
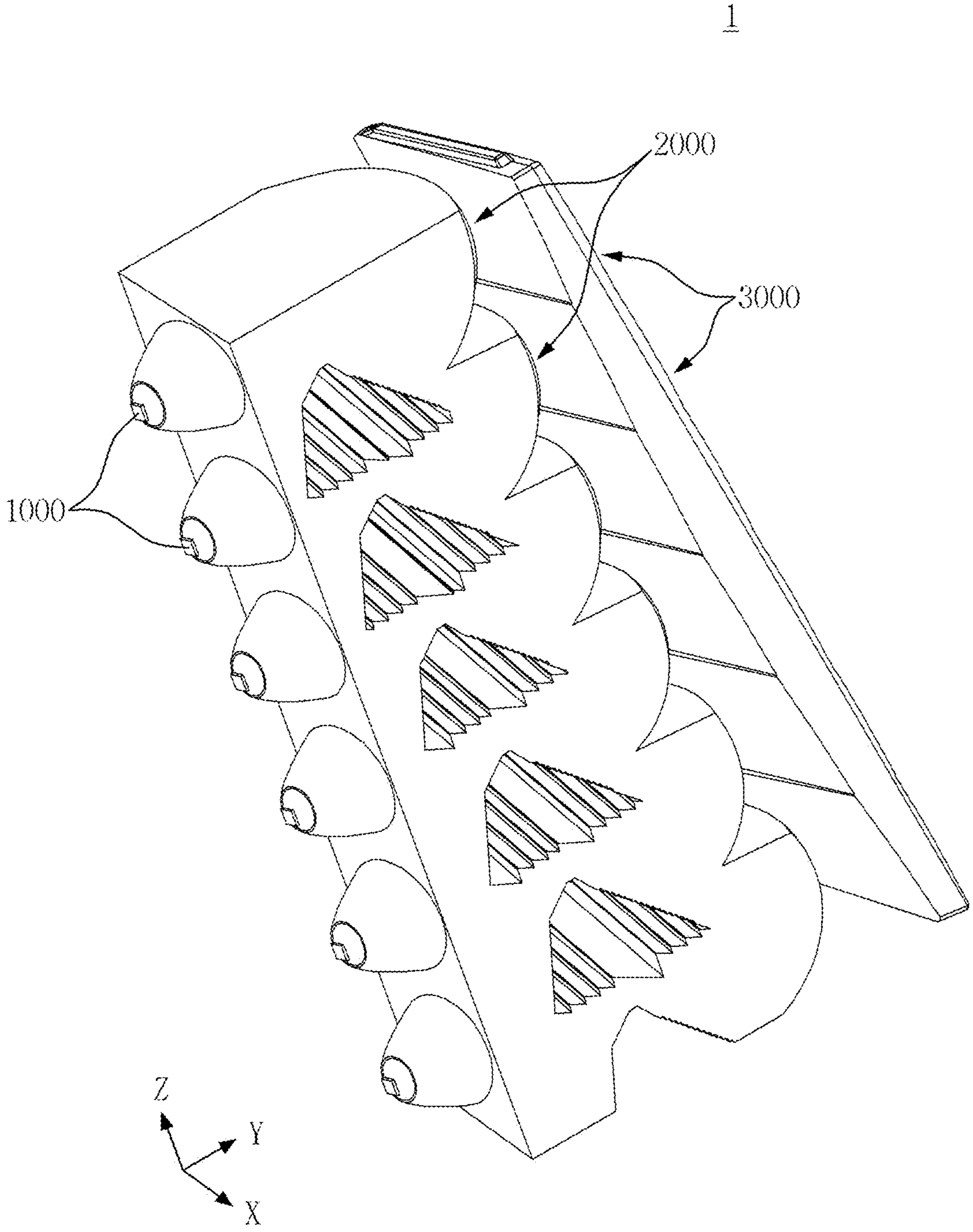
Figure 3:
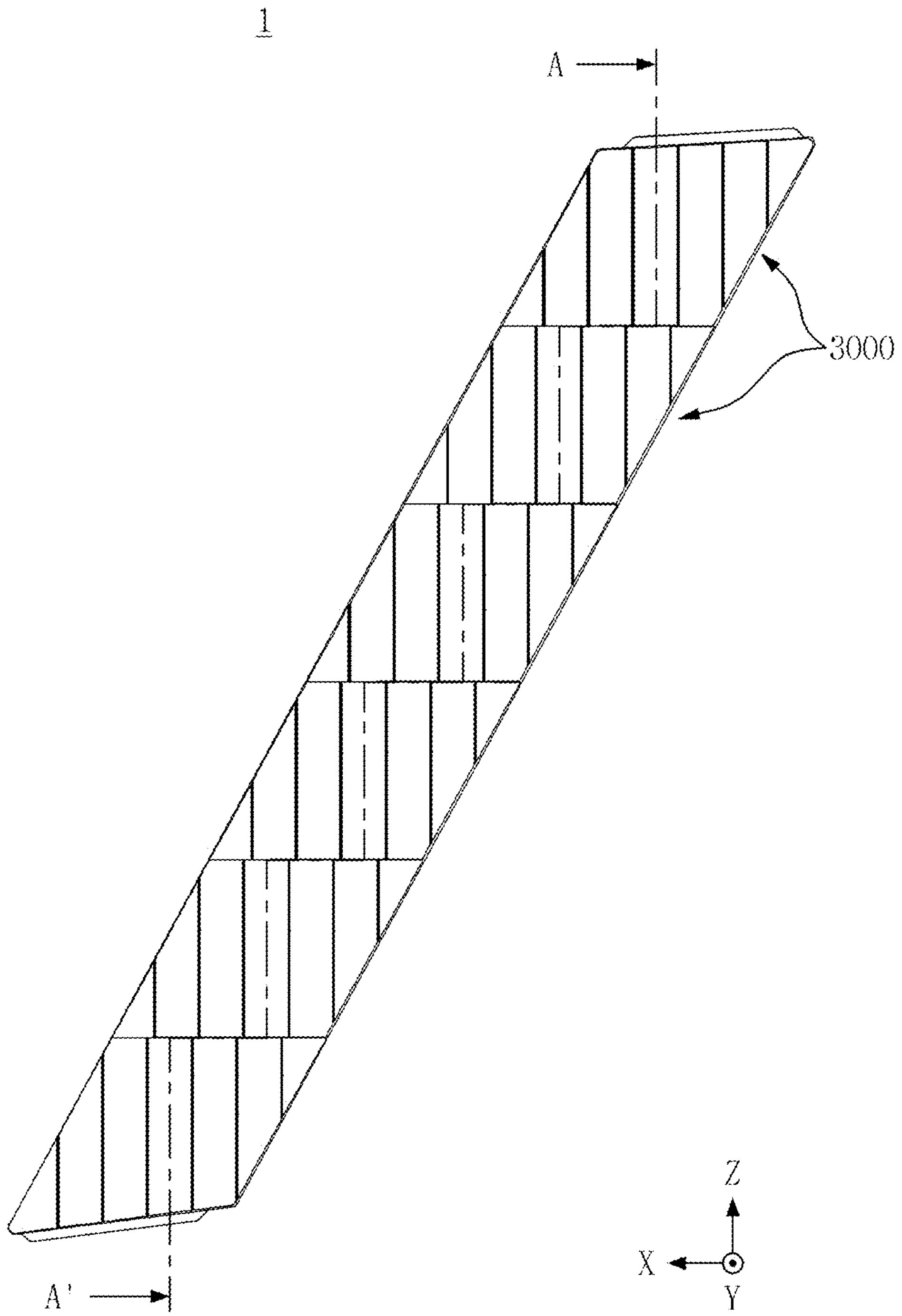
FIG. 3 is a front view illustrating a lamp for a vehicle according to an embodiment of the present disclosure.
Figure 4:
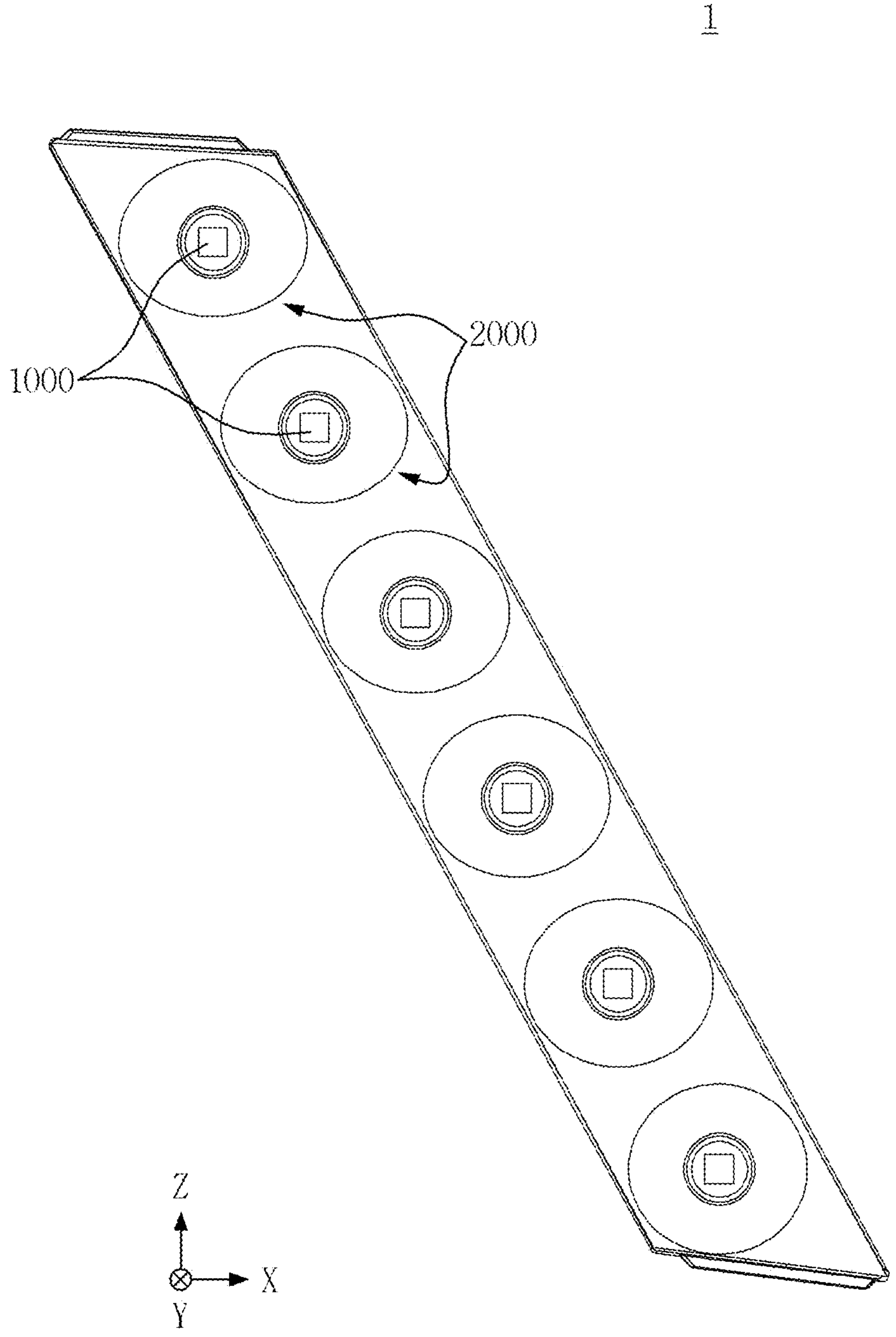
FIG. 4 is a rear view illustrating a lamp for a vehicle according to an embodiment of the present disclosure.
Figure 5:
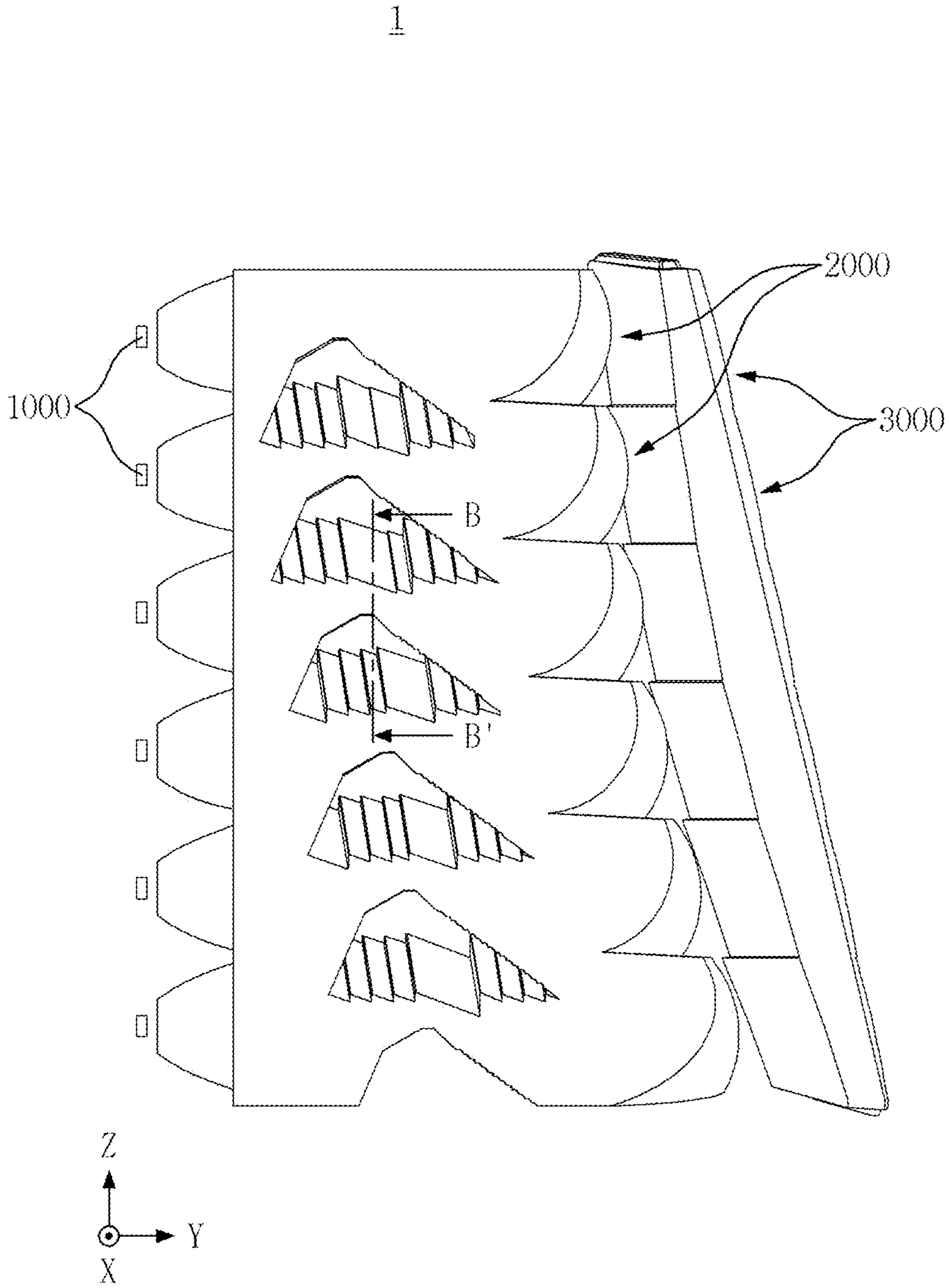
FIG. 5 is a side view illustrating a lamp for a vehicle according to an embodiment of the present disclosure.
Figure 6:
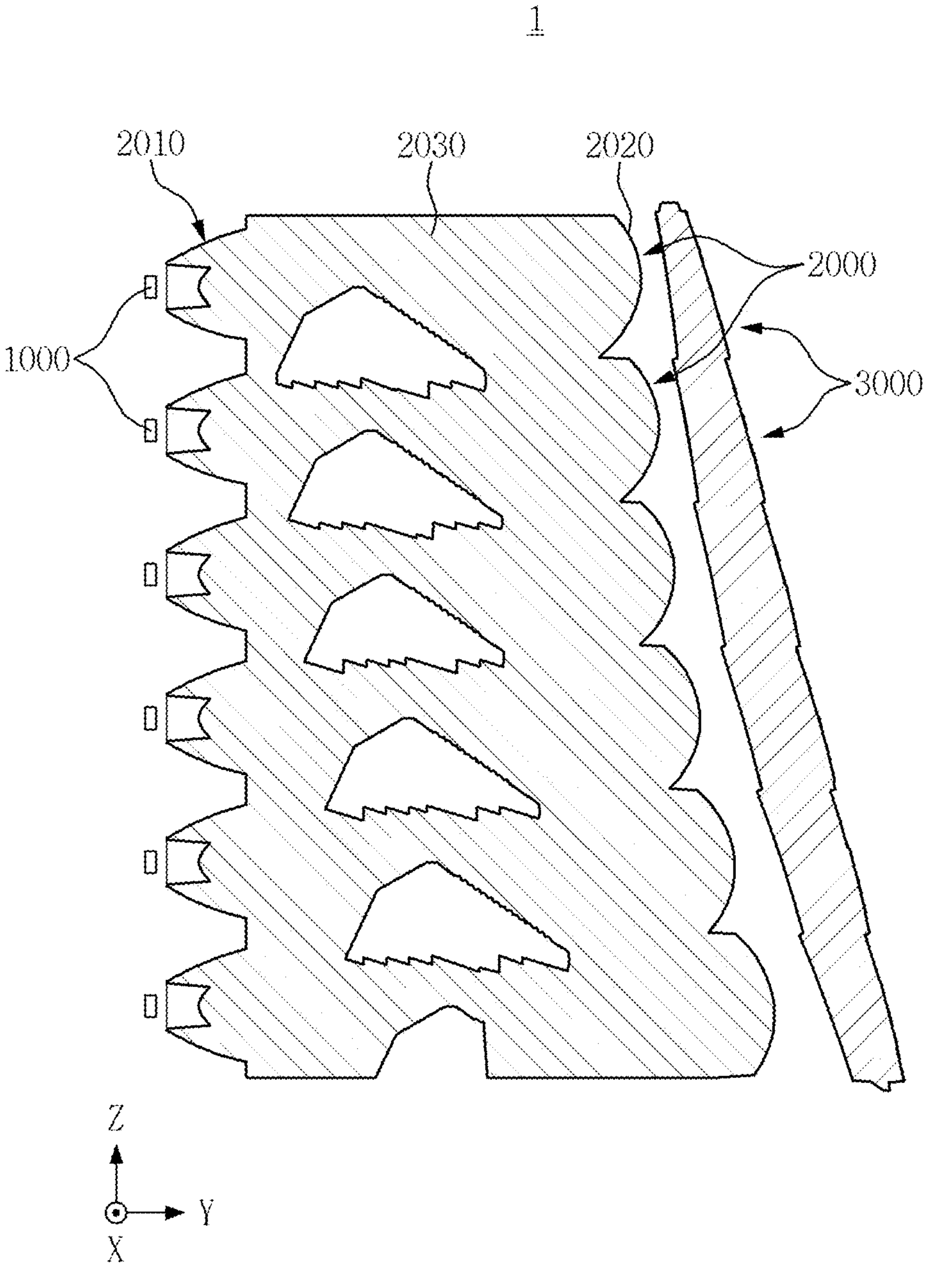
FIG. 6 is a cross-sectional view taken along line A-A' of FIG. 3.

FIGS. 1 and 2 are perspective views showing a lamp for a vehicle according to an embodiment of the present disclosure, FIG. 3 is a front view showing the lamp for a vehicle according to an embodiment of the present disclosure, FIG. 4 is a rear view showing the lamp for a vehicle according to an embodiment of the present disclosure, FIG. 5 is a side view showing the lamp for a vehicle according to an embodiment of the present disclosure, and FIG. 6 is a cross-sectional view taken along line A-A' of FIG. 3.

Referring to FIGS. 1 to 6, a lamp 1 for a vehicle according to an embodiment of the present disclosure may include a plurality of light sources 1000, a plurality of light guiding lenses 2000, and a plurality of optical lenses 3000.

In an embodiment of the present disclosure, a case in which the lamp 1 for a vehicle is used as a head lamp for irradiating light in a driving direction of the vehicle during night driving of the vehicle to secure a front field of view in front of the vehicle will be described by way example. In this regard, a case in which an X-axis direction means a vehicle width direction as a left-right direction (e.g., lateral direction), and a Y-axis direction means a traveling direction (forward or backward) as a front-rear direction (e.g., longitudinal direction), and a Z-axis direction means a vehicle height direction as a vertical direction (e.g., up-down direction) will be described by way of example. However, the present disclosure is not limited thereto, and the directions actually meant by the X-axis, the Y-axis, and the Z-axis may be changed depending on the position at which the lamp for the vehicle 1 of the present disclosure is installed or a direction in which the lamp for the vehicle is oriented.

The example in which the lamp for the vehicle 1 according to an embodiment of the present disclosure acts as the head lamp that irradiates light in the proceeding direction of the vehicle to secure the sight in front of the vehicle is merely an example for helping the understanding of the present disclosure, and the present disclosure is not limited thereto. The lamp 1 for a vehicle according to the present disclosure may be used as various lamps installed in and on the vehicle, such as a tail lamp, a brake lamp, a turn signal lamp, a fog lamp, a backup lamp, a position lamp, and the like, as well as the head lamp.

Figure 7:
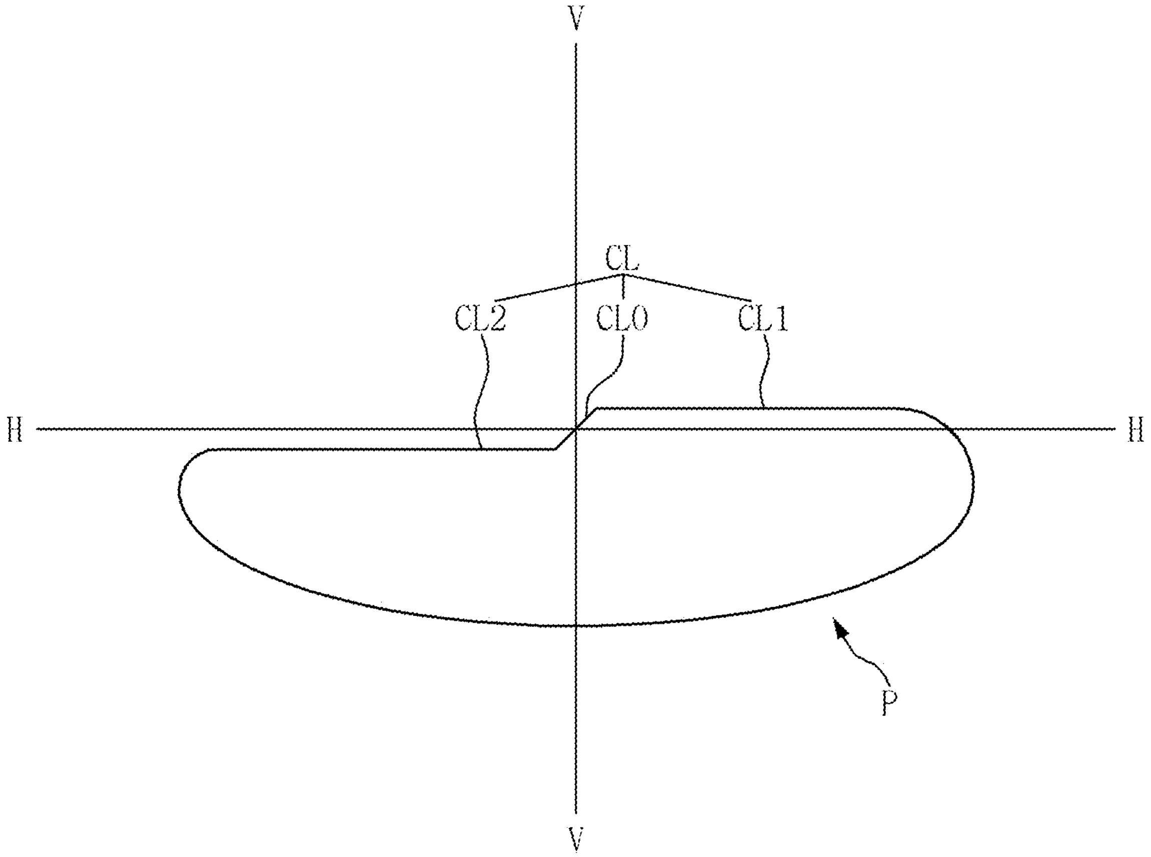
FIG. 7 is a schematic view illustrating a beam pattern generated from a lamp for a vehicle according to an embodiment of the present disclosure.

When the lamp 1 for a vehicle of the present disclosure is used as the head lamp, the lamp 1 for a vehicle of the present disclosure may generate at least one of a low beam pattern for securing a wider field of view within a relatively shorter distance in front of the vehicle by irradiating light to a lower side with respect to a cut-off line so that glare does not occur to a driver of a vehicle in front thereof, such as a preceding vehicle or an on-coming vehicle, or a high beam pattern for securing a field of view along a relatively longer distance in front of the vehicle by irradiating light to an upper side with respect to the cut-off line. Hereinafter, in an embodiment of the present disclosure, a case in which the low beam pattern P is formed when the light is irradiated from the head lamp, that is, the lamp 1 for a vehicle of the present disclosure to the lower side below the cut-off line CL as shown in FIG. 7 will be described by way of example. It may be understood that the low beam pattern P in FIG. 7 may be a beam pattern formed by the lamp for the vehicle 1 of the present disclosure irradiating the light on a screen positioned at a set distance in front of the vehicle.

In this case, the beam pattern of the lamp 1 for a vehicle according to the present disclosure may be formed by overlapping (e.g., superimposing) the beam patterns formed by the plurality of light sources 1000, the plurality of light guiding lenses 2000, and the plurality of optical lenses 3000 corresponding to one another, respectively, with one another.

In one example, in an embodiment of the present disclosure, a case in which the cut-off line CL has a first line CL1 corresponding to the driving lane, a second line CL2 corresponding to an opposite lane thereto, and an inclined line CL0 that connects the first line CL1 and the second line CL2 will be described by way of example. Accordingly, the first line CL1, the second line CL2, and the inclined line CL0 extend in a stepwise manner due to the inclined line CL0 between the first line CL1 and the second line CL2 so that the first line CL1 is formed at a higher position than the second line CL2 such that the light irradiation distance to the driving lane is relatively longer. However, this configuration is merely an example for helping understanding of the present disclosure, and the present disclosure is not limited thereto. The cut-off line CL may be formed to have substantially the same vertical level. In this case, the inclined line CL0 may be omitted, and the first line CL1 and the second line CL2 may extend as one line while forming no step.

The plurality of light sources 1000 may generate light having a light amount and/or color suitable for the use of the lamp for the vehicle 1 of the present disclosure.

In an embodiment of the present disclosure, a case in which the plurality of light sources 1000 are arranged along the vertical direction such that the center positions of the plurality of light sources 1000 do not overlap one another in the vertical direction and thus are disposed closer to one side along the left-right direction gradually as they go upwardly will be described by way of example. This configuration is to allow the plurality of light sources 1000 to be arranged along a body line of the vehicle.

For example, the lamp 1 for a vehicle according to the present disclosure may be accommodated in an inner space defined by a lamp housing and a cover lens assembled to the lamp housing. The plurality of light sources 1000 may be arranged in conformity with the shape of the cover lens that constitutes a portion of the body line (e.g., contour) of the vehicle.

That the plurality of light sources 1000 are arranged along the body line of the vehicle may mean that the plurality of light guiding lenses 2000 and the plurality of optical lenses 3000 may also be arranged along the body line of the vehicle similar to the plurality of light sources 1000.

In this regard, as the plurality of light sources 1000, the plurality of light guiding lenses 2000, and the plurality of optical lenses 3000 are arranged in the vertical direction, the lamp 1 for a vehicle according to the present disclosure may realize a slim outer appearance design, which extends in the vertical direction, thereby improving the aesthetics.

In an embodiment of the present disclosure, a case in which a semiconductor light-emitting device such as a light-emitting diode (LED) is used as each of the plurality of light sources 1000 will be described by way of example. However, the present disclosure is not limited thereto, and various types of light sources such as a laser diode (LD) or a bulb, as well as an LED, may be used as each of the plurality of light sources 1000. Further, optical elements such as a reflector, a prism, a mirror, and a phosphor for adjusting a path, brightness, color, and the like of light may be additionally used depending on the type of the light sources.

Each of the plurality of light guiding lenses 2000 may be disposed in front of a corresponding light source among the plurality of light sources 1000 to allow at least a portion of the light emitted from the corresponding light source among the plurality of light sources 1000 to be incident thereto.

The plurality of light guiding lenses 2000 may be arranged in the vertical direction in accordance with the arrangement direction of the plurality of light sources 1000. In an embodiment of the present disclosure, a case in which the plurality of light guiding lenses 2000 arranged along the vertical direction are integrally formed with each other to reduce the number of components and simplify the assembly process to reduce costs will be described by way of example.

The plurality of light guiding lenses 2000 may be arranged along the vertical direction such that the center positions thereof may not overlap with one another in the vertical direction and thus may be disposed closer to one side gradually along the left-right direction as they go upwardly, in the similar manner to the plurality of light sources 1000.

Each of the plurality of light guiding lenses 2000 may include a light receiving portion 2010 to which the light emitted from the corresponding light source among the plurality of light sources 1000 is incident, a light emission portion 2020 disposed in front of the light receiving portion 2010 to allow the light incident on the light receiving portion 2010 to be emitted therefrom, and a light transfer portion 2030 to transfer at least a portion of the light incident on the light receiving portion 2010 to the light emission portion 2020.

Adjacent light receiving portions 2010 of the plurality of light guiding lenses 2000 may be spaced apart from each other by a predetermined spacing to prevent or reduce interference from occurring between light beams respectively emitted from corresponding light sources thereto among the plurality of light sources 1000.

The plurality of light guiding lenses 2000 may be integrally formed with one another by connecting each of the light receiving portions 2010 and each of the light emission portions 2020 via each of the light transfer portions 2030, thereby reducing the number of components and simplifying the assembly process.

In addition, the light emission portion 2020 of each of the plurality of light guiding lenses 2000 may have a curved shape that is formed convex in a frontward direction for concentrating the emitted light.

The plurality of light guiding lenses 2000 may have different lengths in the front-rear direction (e.g., longitudinal lengths) such that the lengths of the light guiding lenses increase as the plurality of light guiding lenses 2000 go downwardly. This configuration may be derived from the configuration that the longitudinal positions of the plurality of light sources 1000 coincide with one another, whereas the longitudinal positions of the plurality of optical lenses 3000 protrude more forward gradually as the plurality of optical lenses 3000 are arranged downwardly.

In other words, when the positions of the plurality of optical lenses 3000 protrude more forward as the plurality of optical lenses 3000 are arranged along the body line of the vehicle and downwardly, a step needs to be formed between adjacent ones of the light-emission portions 2020 of the light guiding lenses such that a position of the light-emission portion 2020 of the light guiding lens disposed at the lower side among the plurality of light guiding lenses 2000 protrudes more in the frontward direction. When the plurality of light sources 1000 have the same position in the front-rear direction such that the plurality of light sources 1000 can be installed on one common substrate, the lengths in the front-rear direction of the light guiding lenses increase as the plurality of light guiding lenses 2000 are arranged downwardly such that the position of the light-emission portion 2020 of the light guiding lens disposed at the lower side among the plurality of light guiding lenses 2000 protrudes more in the frontward direction.

In this case, the plurality of light sources 1000 may be installed on one common substrate to allow the number of components to be reduced compared to the case where a separate individual substrate is used for each of the plurality of light sources 1000, thereby reducing the cost and simplifying the assembly process.

Figure 8:
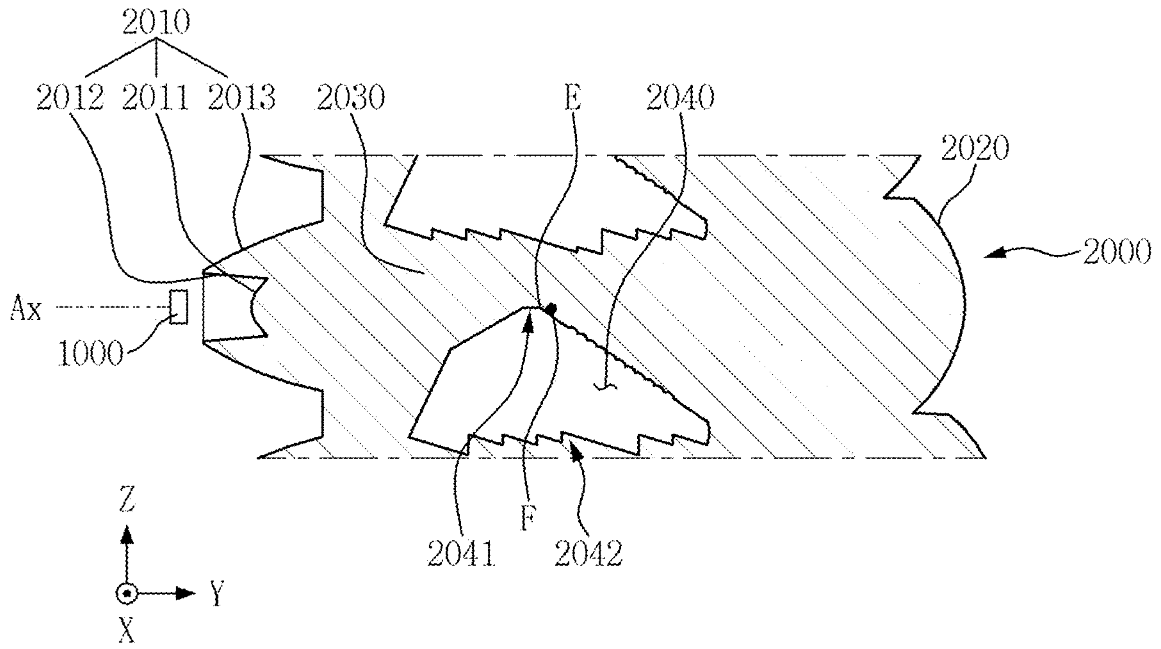
FIG. 8 is a cross-sectional view illustrating a light guiding lens according to an embodiment of the present disclosure.

FIG. 8 is a cross-sectional view illustrating a light guiding lens according to an embodiment of the present disclosure, and FIG. 8 is an example in which one of the plurality of light guiding lenses 2000 is illustrated.

Referring to FIG. 8, the light receiving portion 2010 of each of the plurality of light guiding lenses 2000 may allow the light incident thereto from the corresponding light source 1000 among the plurality of light sources 1000 to be focused on or near a focus F in rear of the light emission portion 2020. In this case, the rear focus F of the light emission portion 2020 may have a shape of a point, a line, a surface, a space, or a combination thereof depending on an area on which the light is substantially condensed.

The light receiving portion 2010 may include a central surface 2011 coinciding with an optical axis Ax of the corresponding light source among the plurality of light sources 1000, a protruding surface 2012 that protrudes toward the corresponding light source from a peripheral edge of the central surface 2011, and a reflective surface 2013 that reflects the light incident on the protruding surface 2012 to allow it to travel toward the light emission portion 2020. The reflective surface 2013 may be formed such that a lateral spacing between the reflective surface 2013 and the optical axis Ax increases as the reflective surface 2013 extends from a rear end to a front end along the optical axis Ax direction of the corresponding light source so that the light incident thereto from the protruding surface 2012 travels forward.

The light transfer portion 2030 may transmit at least a portion of the light incident thereto from the light receiving portion 2010 to the light emission portion 2030. The light receiving portion 2010 and the light emission portion 2020 may be integrally formed with each other via the light transfer portion 2030.

In order to form the low beam pattern P of FIG. 7 using the lamp 1 for a vehicle according to the present disclosure, it may be necessary to block a portion of the light incident to the light receiving portion 2010 and proceeding to the light emission portion 2020 in order to form the cut-off line CL. To this end, a shield hole (e.g., a shield void) 2040 may be formed between adjacent light guiding lenses among the plurality of light guiding lenses 2000.

The shield hole 2040 may include a shield portion 2041 and a connection portion 2042. The shield portion 2041 may be formed to be inclined generally downward in both the frontward and rearward directions around an edge portion E formed at an apex disposed at or near the rear focus F of the light emission portion 2020, and thus may be formed to have a concave shape along a lower surface of the light transfer portion 2030. The connection portion 2042 may connect both opposing ends in the front-rear direction of the shield portion 2041 to each other, such that the shield hole 2040 may generally have an approximately triangular shape. In the light guiding lens disposed at the bottom end among the plurality of light guiding lenses 2000, the connection portion 2042 may be absent in the shield hole 2040. Instead, the shield hole 2040 of the light guiding lens disposed at the bottom may be formed to have a concave shape defined by the shield portion 2031.

In other words, when the plurality of light guiding lenses 2000 are integrally formed with one another, the shield hole 2040 may be formed between the light guiding lenses adjacent to each other in the vertical direction among the plurality of light guiding lenses 2000 in order to form the shield portion 2041. For this reason, the connection portion 2042 may be present. However, in the light guiding lens at the bottom end among the plurality of light guiding lenses 2000, the shield portion 2041 may be formed without forming the shield hole 2040. For this reason, the connection portion 2042 may be omitted for the shield portion 2041 at the bottom of the plurality of light guiding lenses 2000.

In this regard, the shield hole 2040 may be formed between adjacent light guiding lenses among the plurality of light guiding lenses 2000 as the plurality of light guiding lenses 2000 are integrally formed with one another while being arranged in the vertical direction. However, the present disclosure is not limited thereto, and if the plurality of light guiding lenses 2000 are separate from one another, the connection portion 2042 may be absent in the shield hole 2040 of each of the plurality of light guiding lenses 2000, and thus the shield portion 2041 having the concave shape may be formed along the lower surface of the light transfer portion 2030.

The position and shape of the cut-off line CL of the low beam pattern P may vary depending on the position and shape of the edge portion E of the shield portion 2041.

Figure 9:
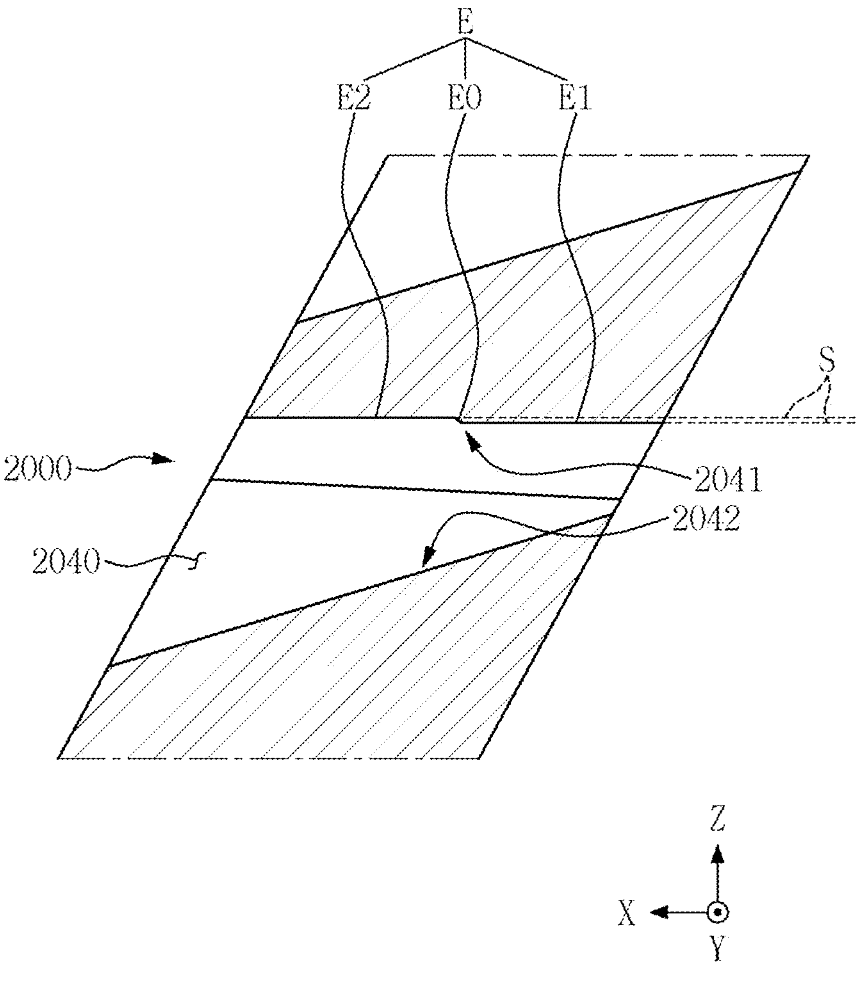
FIG. 9 is a cross-sectional view taken along line B-B' of FIG. 5.

FIG. 9 is a cross-sectional view taken along line B-B' of FIG. 5, and FIG. 9 is an example in which an edge portion E of one of a plurality of light guiding lenses 2000 is illustrated.

Referring to FIG. 9, the edge portion E according to an embodiment of the present disclosure may include an inclined edge E0, and a first edge E1 and a second edge E2 formed to extend in a left-right direction from a lower end and an upper end of the inclined edge E0, respectively, to be parallel to a horizontal line S. In this case, the inclined edge E0 may serve to form the inclined line CL0, the first edge E1 may serve to form the first line CL1, and the second edge E2 may serve to form the second line CL2.

In an embodiment of the present disclosure, the first edge E1, the inclined edge E0, and the second edge E2 that extend in the stepwise manner may correspond to the configuration that both opposing portions of the cut-off line CL of the beam pattern to be formed by the lamp for the vehicle 1 of the present disclosure have the discrete vertical levels to form the step in the vertical direction as shown in FIG. 7 described above. However, the present disclosure is not limited thereto, and when the cut-off line CL is to be formed as a single line with no step, the edge portion E may be formed as one edge in which the inclined edge E0 is omitted, and the step may not be formed between the first edge E1 and the second edge E2.

The cut-off line CL as described above may extend to be generally parallel to the horizontal line S and aligned along the left-right direction. When at least a portion of the cut-off line CL is formed to protrude beyond a reference line parallel to the horizontal line S, glare may occur toward a driver of a vehicle ahead of the vehicle of interest. On the contrary, when at least a portion of the cut-off line CL is formed to be recessed from the reference line parallel to the horizontal line S, the area to which the light is irradiated may be reduced, thereby reducing the field of view in front of the vehicle of interest. For this reason, the cut-off line CL as described above may extend to be generally parallel to the horizontal line S.

The edge portion E may generally extend in parallel with the horizontal line S so that the cut-off line CL may generally extend in parallel with the horizontal line S. The edge portion E of at least one of the plurality of light guiding lenses 2000 may extend in an inclined manner at a predetermined angle with respect to the reference line parallel to the horizontal line S according to light distribution characteristics required in the beam pattern formed by the lamp 1 for a vehicle of the present disclosure, that is, a position, size, shape, brightness, and the like of the region to which the light is irradiated. The description that the edge portion E extends in an inclined manner at a predetermined angle with respect to the reference line parallel to the horizontal line S may mean that a combination of the first edge E1 and the second edge E2 as described above extends in an inclined manner at the predetermined angle with respect to the reference line parallel to the horizontal line S.

Figure 10:
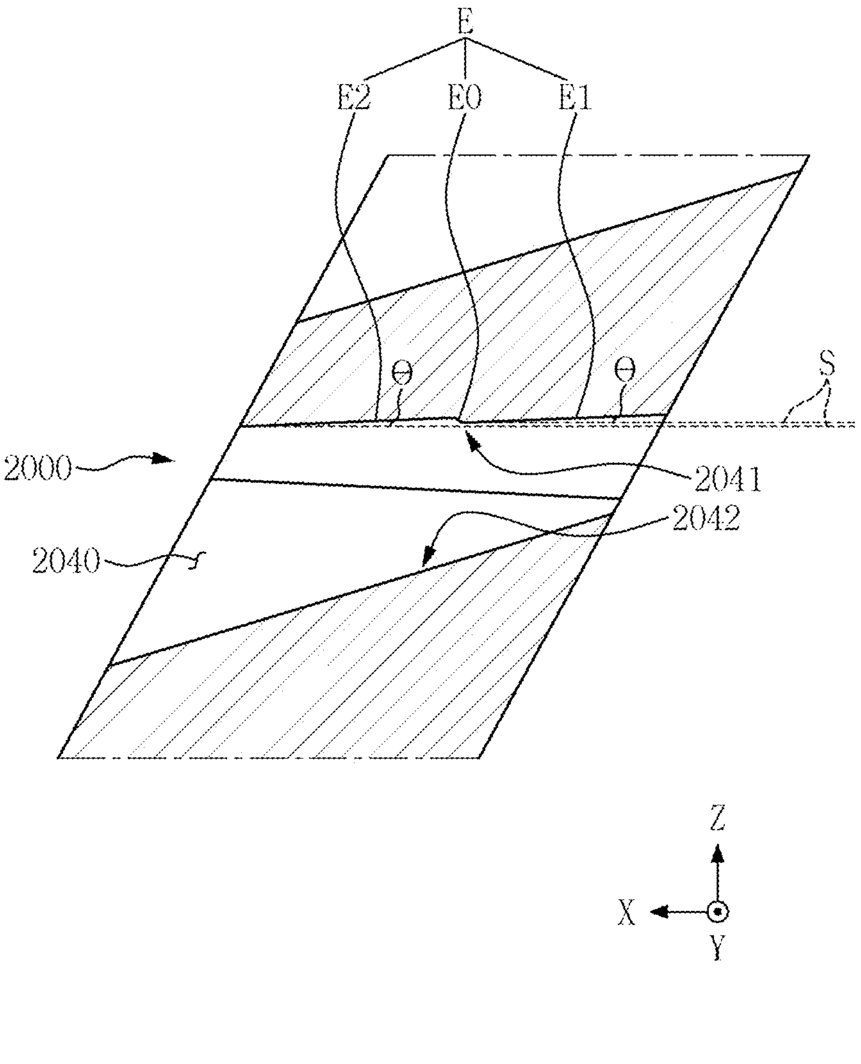
FIGS. 10 and 11 are cross-sectional views showing a formation angle of an edge portion according to an embodiment of the present disclosure.
Figure 11:
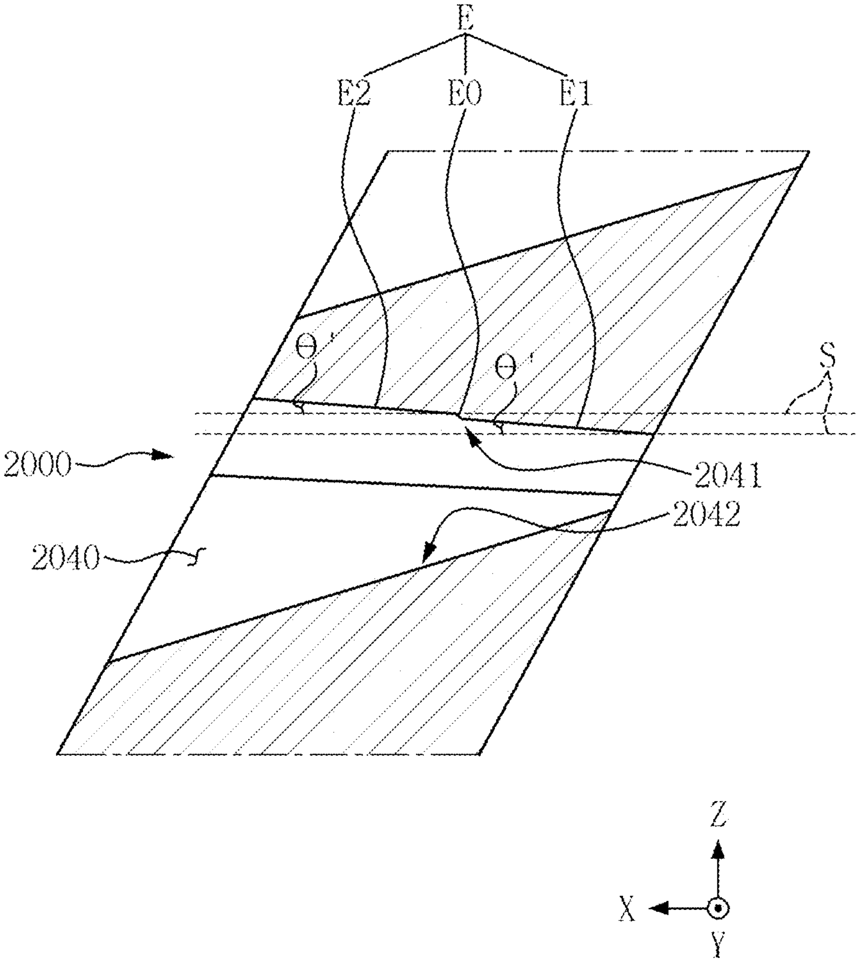

In this case, the description that the edge portion E extends in an inclined manner at the predetermined angle with respect to the horizontal line S may mean that the combination of the first edge E1 and the second edge E2 extends in an inclined manner at each of predetermined angles θ and θ' in the right upward direction or the left upward direction with respect to the reference line parallel to the horizontal line S, as shown in FIGS. 10 and 11.

In some embodiments of the present disclosure, the plurality of light guiding lenses 2000 may be arranged along the vertical direction such that the center positions thereof may not overlap one another in the vertical direction and thus are disposed closer to one side along the left-right direction progressively as the positions are arranged upwardly as described above. Thus, due to the lateral offsets of the edge portions E of the plurality of light guiding lenses 2000, the cut-off line CL may not be formed in parallel with the horizontal line S but may extend in an inclined manner in the right upward direction or the left upward direction in the left-right direction. In this case, glare may occur toward a driver of a vehicle ahead of the vehicle of interest or the field of view in front of the vehicle may be deteriorated. For this reason, the edge portion E of at least one of the plurality of light guiding lenses 2000 may extend in an inclined manner upwardly to the right or upwardly to the left with respect to the reference line parallel to the horizontal line S.

In this regard, the edge portion E of at least one of the plurality of light guiding lenses 2000 may extend in an inclined manner upwardly to the right or upwardly to the left with respect to the reference line parallel to the horizontal line S. This configuration is intended to address the problem that when a single focus is formed by a corresponding set of a light guiding lens and an optical lens among the plurality of light guiding lenses 2000 and the plurality of optical lenses 3000, the cut-off line CL extends to be not parallel to the horizontal line S but to be inclined in the left-upward direction or the right-upward direction in the left-right direction due to the difference between the positions in the left-right direction of the edge portions E of the plurality of light guiding lenses 2000. Thus, when the edge portion E of at least one of the plurality of light guiding lenses 2000 extends in an inclined manner upwardly to the right or upwardly to the left with respect to the reference line parallel to the horizontal line S, the cut-off line CL may extend to be parallel to the horizontal line S.

In an embodiment of the present disclosure, a case in which the position of the single focus is determined based on a shape such as a curvature of each of the light emission portion 2020 of the light guiding lens and a light receiving surface 3010 of the optical lens corresponding to each other among the plurality of light guiding lenses 2000 and the plurality of optical lenses 3000 will be described by way of example. However, this is to help understanding of the present disclosure. The position of the single focus may be determined based on the shape of each of the light-emission portion 2020 of the light guiding lens, the light receiving surface 3010 of the optical lens, and the light emission surface 3020 of the optical lens which correspond to each other.

In this regard, forming the single focus by the light guiding lens and the optical lens corresponding to each other among the plurality of light guiding lenses 2000 and the plurality of optical lenses 3000 is intended to address a potential problem that when different individual focuses are respectively formed by the light guiding lens and the optical lens corresponding to each other among the plurality of light guiding lenses 2000 and the plurality of optical lenses 3000, the light emitted from each of the plurality of light guiding lenses 2000 may be incident on another adjacent optical lens as well as the corresponding optical lens among the plurality of optical lenses 3000, such that a glare or the like may be caused. Instead, the single focus may be formed by the light guiding lens and the optical lens corresponding to each other among the plurality of light guiding lenses 2000 and the plurality of optical lenses 3000. Thus, when light beams respectively emitted from the plurality of light guiding lenses are incident on not only the corresponding optical lenses but also adjacent optical lenses, the light beams may travel in parallel with each other, thereby preventing the glare from being caused.

Figure 12:
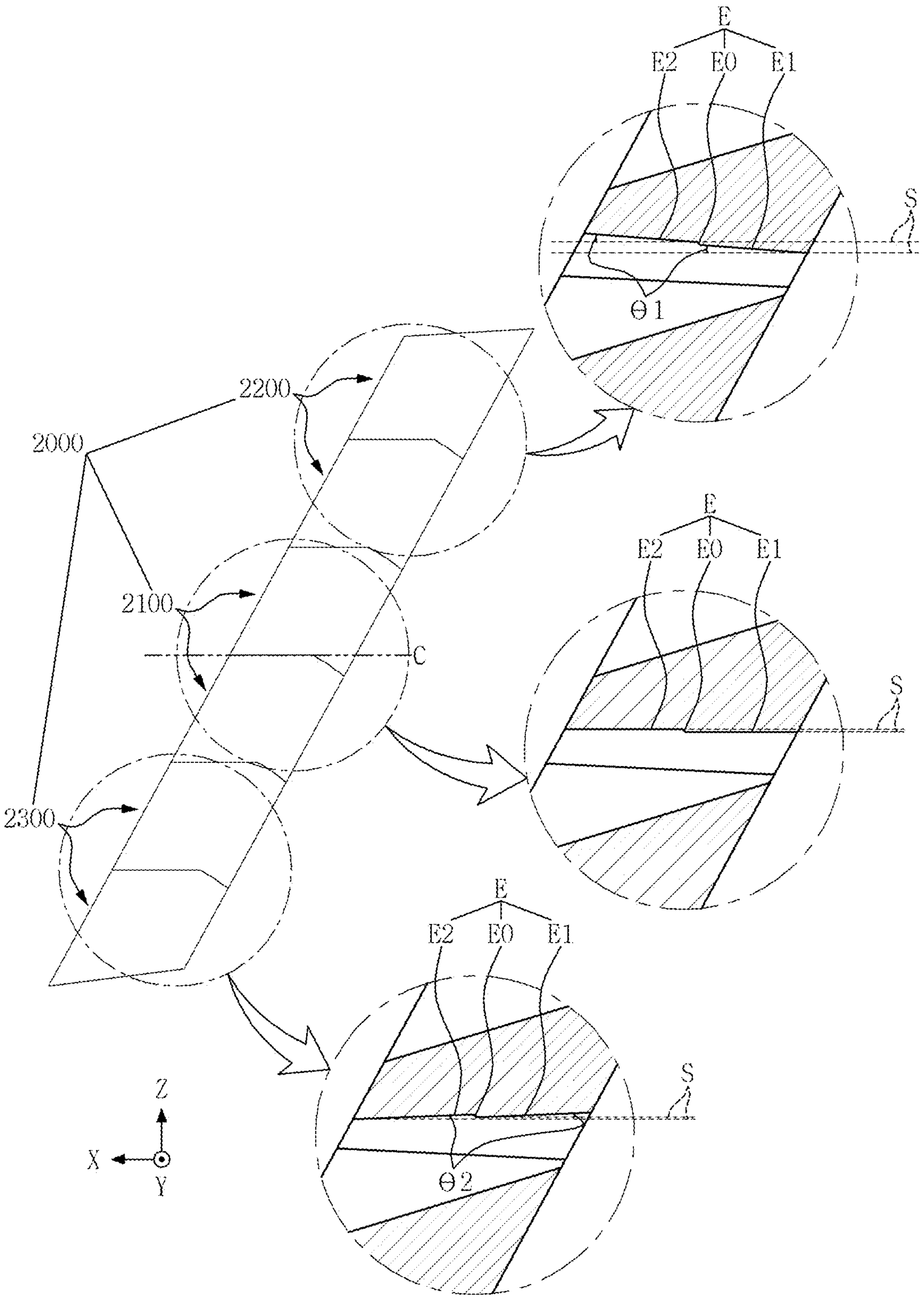
FIG. 12 is a schematic view illustrating a formation angle of an edge portion of each of a plurality of light guiding lenses according to an embodiment of the present disclosure.

FIG. 12 is a schematic view illustrating a formation angle of the edge portion of each of a plurality of light guiding lenses according to an embodiment of the present disclosure. Referring to FIG. 12, an upper light guiding lens 2200 may be disposed on top of at least one light guiding lens 2100 disposed at the vertical middle level among the plurality of light guiding lenses 2000 while a lower light guiding lens 2300 may be disposed under the at least one light guiding lens 2100 disposed at the vertical middle level among the plurality of light guiding lenses 2000. In this case, the edge portion E of the upper light guiding lens 2200 and the edge portion E of the lower light guiding lens 2300 may extend in the inclined manner in opposite directions with respect to each other.

Hereinafter, in one embodiment of the present disclosure, the light guiding lens disposed at the vertical middle level among the plurality of light guiding lenses 2000 will be collectively referred to as a first light guiding lens 2100. The light guiding lens disposed on top of the first light guiding lens is referred to as the second light guiding lens 2200, and the light guiding lens disposed under the first light guiding lens is referred to as the third light guiding lens 2300.

In some embodiments of the present disclosure, a case where the first light guiding lens 2100 extends along the center line C that passes through the vertical middle level of the vertical arrangement of the plurality of light guiding lenses 2000, and two light guiding lenses are disposed on top of and under the first light guiding lens 2100 will be described by way of example. This configuration is merely an example for helping understanding of the present disclosure, and the present disclosure is not limited thereto. Even when the light guiding lens is disposed closer to the above-described single focus such that the edge portion E of the light guiding lens extends in parallel to the horizontal line S, the light guiding lens in which the cut-off line CL extends in parallel to the horizontal line S may be collectively referred to as the first light guiding lens 2100.

In this regard, the edge portions E of the second light guiding lens 2200 and the third light guiding lens 2300 may extend in an inclined manner with respect to the reference line parallel to the horizontal line S in the opposite directions with respect to each other.

For example, the second light guiding lens 2200 may extend in an inclined manner at a predetermined angle θ1 such that a first side in the left-right direction of the edge portion E closer to the first light guiding lens 2100 has a higher vertical level than a second side thereof. Similarly, the third light guiding lens 2300 may extend in an inclined manner at a predetermined angle θ2 such that a first end in the left-right direction of the edge portion E closer to the first light guiding lens 2100 has a higher vertical level than a second side thereof. Since the second light guiding lens 2200 and the third light guiding lens 2300 are disposed at opposite positions around the first light guiding lens 2100 in the left-right direction, the edge portions E of the second light guiding lens 2200 and the third light guiding lens 2300 may extend in an inclined manner with respect to the reference line parallel to the horizontal line S in the directions opposite to each other.

In some embodiments of the present disclosure, the edge portions E of the second light guiding lens 2200 and the third light guiding lens 2300 may extend to be inclined respectively at predetermined angles θ1 and θ2 with respect to the reference line parallel to the horizontal line S. This configuration is intended to cope with a problem that when the light guiding lens and the optical lens corresponding to each other among the plurality of light guiding lenses 2000 and the plurality of optical lenses 3000 have a single focus, the cut-off line CL extends not to be parallel to the horizontal line S but at least a portion thereof is disposed on top of or under the reference line parallel to the horizontal line S, due to the different lateral positions in the left-right direction among the first light guiding lens 2100, the second light guiding lens 2200, and the third light guiding lens 2300. Under such a condition, glare may be caused to the driver of the vehicle ahead of the vehicle of the interest or the field of view in front of the vehicle may be deteriorated.

Figure 13:
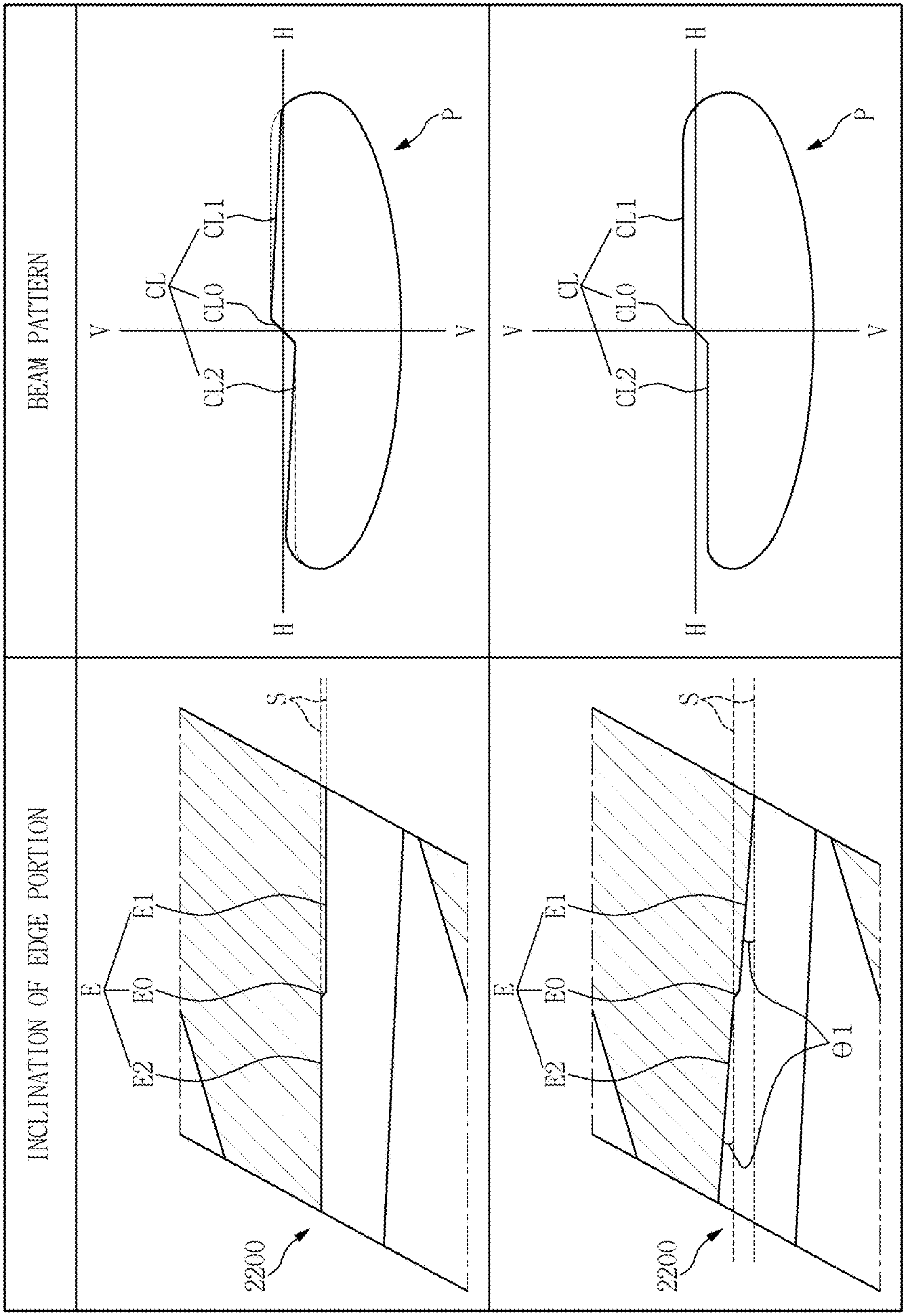
FIGS. 13 and 14 are schematic views showing beam patterns according to a formation angle of an edge portion of each of a light guiding lens according to an embodiment of the present disclosure.

For example, as shown in FIG. 13, when the edge portion E of the second light guiding lens 2200 extends in parallel with the horizontal line S, at least a portion of the first line CL1 may be formed at a lower vertical level that that of a desired and correct position (shown as a dashed line), and at least a portion of the second line CL2 may be formed at a higher vertical level that that of a desired and correct position (shown as a dashed line). To address this issue, in a front view of the lamp for the vehicle 1 of the present disclosure, the edge portion E may be formed to extend in an inclined manner at a predetermined angle θ1 upwardly to the left with respect to the reference line parallel to the horizontal line S, so that the first line CL1 and the second line CL2 may coincide with the correct position and to extend substantially in parallel with the horizontal line S.

Figure 14:
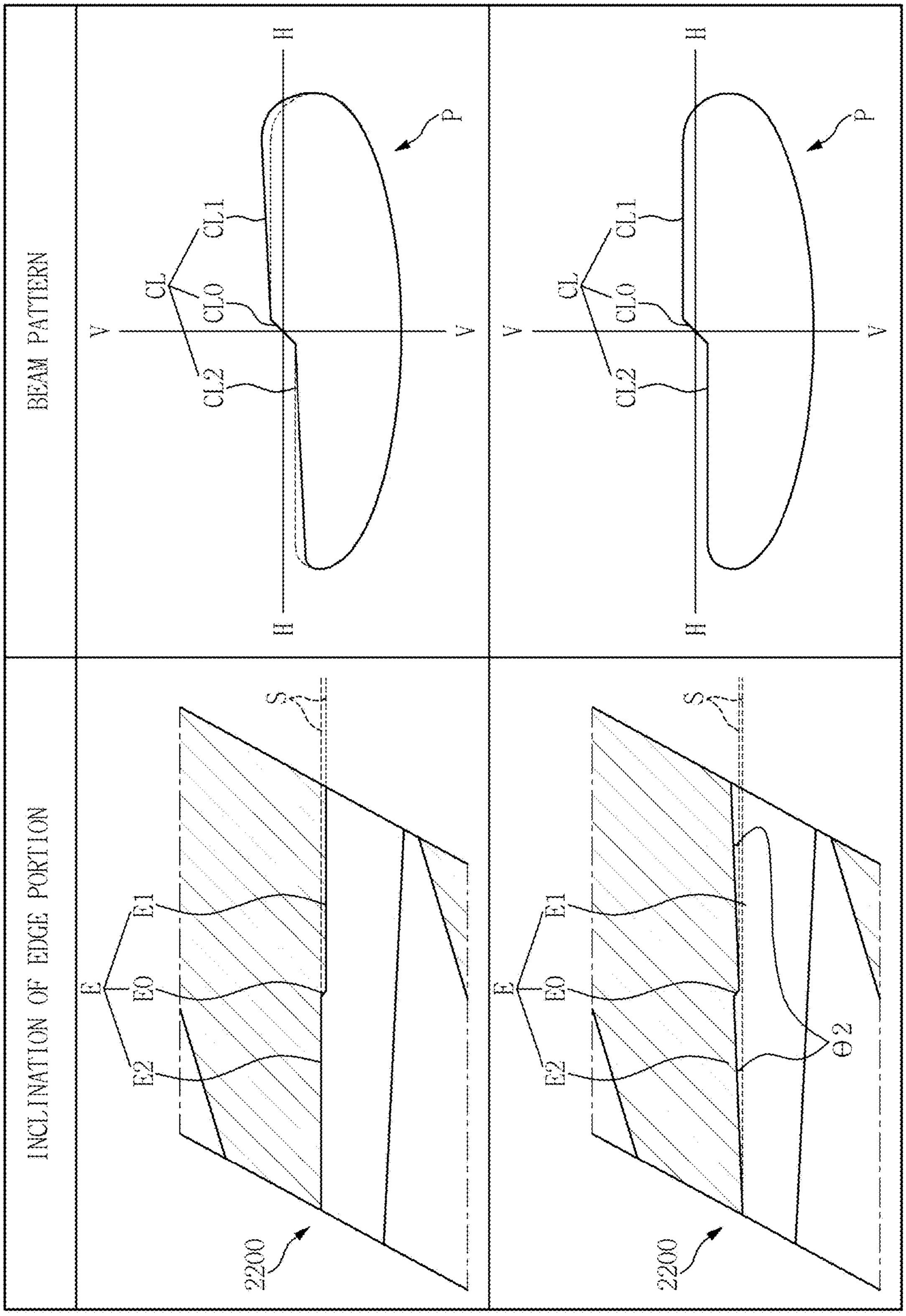

In addition, as shown in FIG. 14, when the edge portion E of the third light guiding lens 2300 extends in parallel with the horizontal line S, at least a portion of the first line CL1 may be formed at a higher vertical level that that of a desired and correct position (shown as a dashed line), and at least a portion of the second line CL2 may be formed at a lower vertical level that that of a desired and correct position (shown as a dashed line). To address such an issue, in a front view of the lamp for the vehicle 1 of the present disclosure, the edge portion E may be formed to extend in an inclined manner at a predetermined angle θ2 upwardly to the right with respect to the reference line parallel to the horizontal line S, so that the first line CL1 and the second line CL2 may coincide with the correct position and to extend substantially in parallel with the horizontal line S.

In this regard, each of a direction in which the edge portion E of the second light guiding lens 2200 is inclined and a direction in which the edge portion E of the third light guiding lens 2300 is inclined may be varied based on a direction in which each of the second light guiding lens 2200 and the third light guiding lens 2300 is laterally spaced apart from the first light guiding lens 2100 in the left-right direction.

In other words, in an embodiment of the present disclosure, in the front view of the lamp for the vehicle 1 of the present disclosure, the second light guiding lens 2200 may be spaced apart from the first light guiding lens 2100 to the right side, and the third light guiding lens 2300 may be spaced apart from the first light guiding lens 2100 to the left side. Thus, the edge portion E of the second light guiding lens 2200 may be configured to extend in an inclined manner upwardly to the left, and the edge portion E of the third light guiding lens 2300 may be configured to extend in an inclined manner upwardly to the right. On the contrary, when the second light guiding lens 2200 is spaced apart from the first light guiding lens 2100 to the left and the third light guiding lens 2300 is spaced apart from the first light guiding lens 2100 to the right, the edge portion E of the second light guiding lens 2200 may be configured to extend in an inclined manner upwardly to the right, and the edge portion E of the third light guiding lens 2300 may be configured to extend in an inclined manner upwardly to the left.

In one example, each of the second light guiding lens 2200 and the third light guiding lens 2300 may be provided in plurality. In this case, the angle at which the edge portion E of a corresponding light guiding lens is inclined may increase as a distance thereof with respect to the first light guiding lens 2100 in the left-right direction increases.

Figure 15:
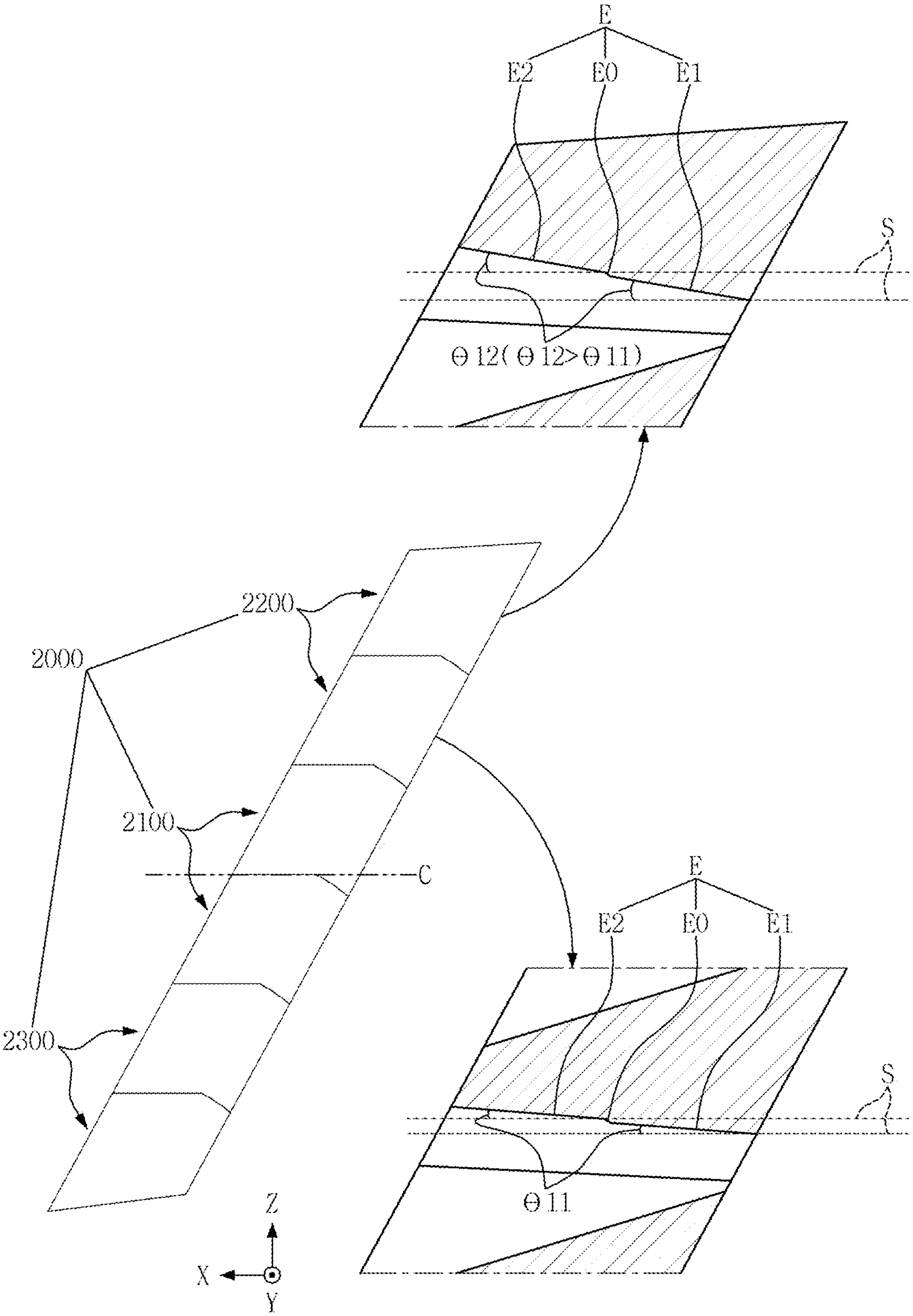
FIGS. 15 and 16 are schematic views showing a formation angle of an edge portion based on a position of a light guiding lens according to an embodiment of the present disclosure.

For example, a plurality of second light guiding lenses 2200 may be provided, as shown in FIG. 15. In this case, as an upper second light guiding lens 2200 is spaced apart from the first light guiding lens 2100 by a greater distance in the left-right direction than a lower second light guiding lens 2200, the edge portions E of the upper and lower second light guiding lenses 2200 may extend in an inclined manner in the same direction while the upper second light guiding lens 2200 may extend in an inclined manner at a greater angle (θ12>θ11) than the lower second light guiding lenses 2200.

Figure 16:
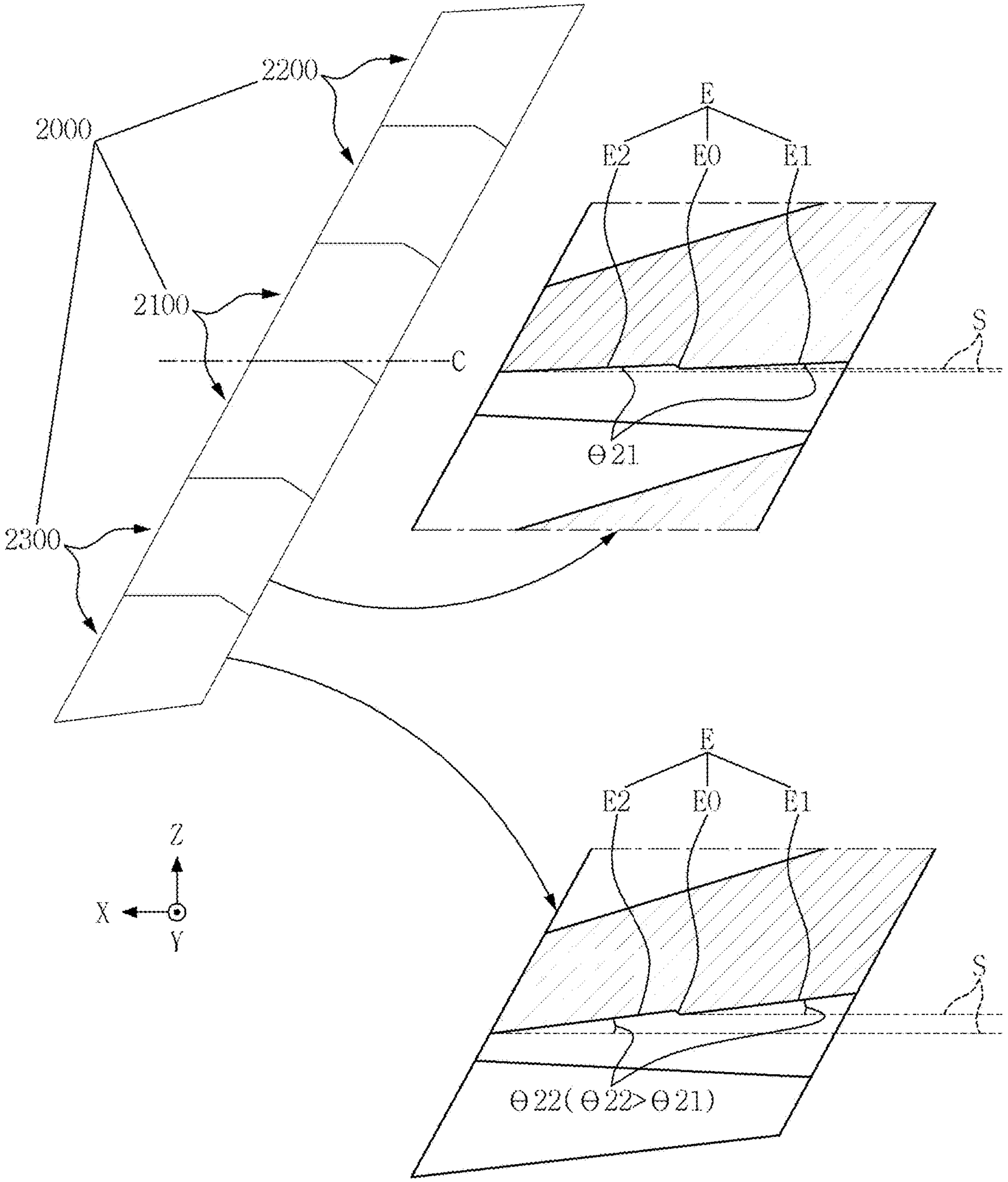

Similarly, a plurality of third light guiding lenses 2300 may be provided, as shown in FIG. 16. In this case, as a lower third light guiding lens 2300 is spaced apart from the first light guiding lens 2100 by a greater distance in the left-right direction than an upper third light guiding lens 2300 is, the edge portions E of the upper and lower third light guiding lenses 2300 may extend in an inclined manner in the same direction while the lower third light guiding lens 2300 may extend in an inclined manner at a greater angle (θ22>θ21) than the upper third light guiding lenses 2300.

Each of the plurality of optical lenses 3000 may transmit the light emitted from a corresponding light guiding lens among the plurality of light guiding lenses 2000 therethrough to form a beam pattern suitable for the use of the lamp 1 for a vehicle of the present disclosure.

Figure 17:
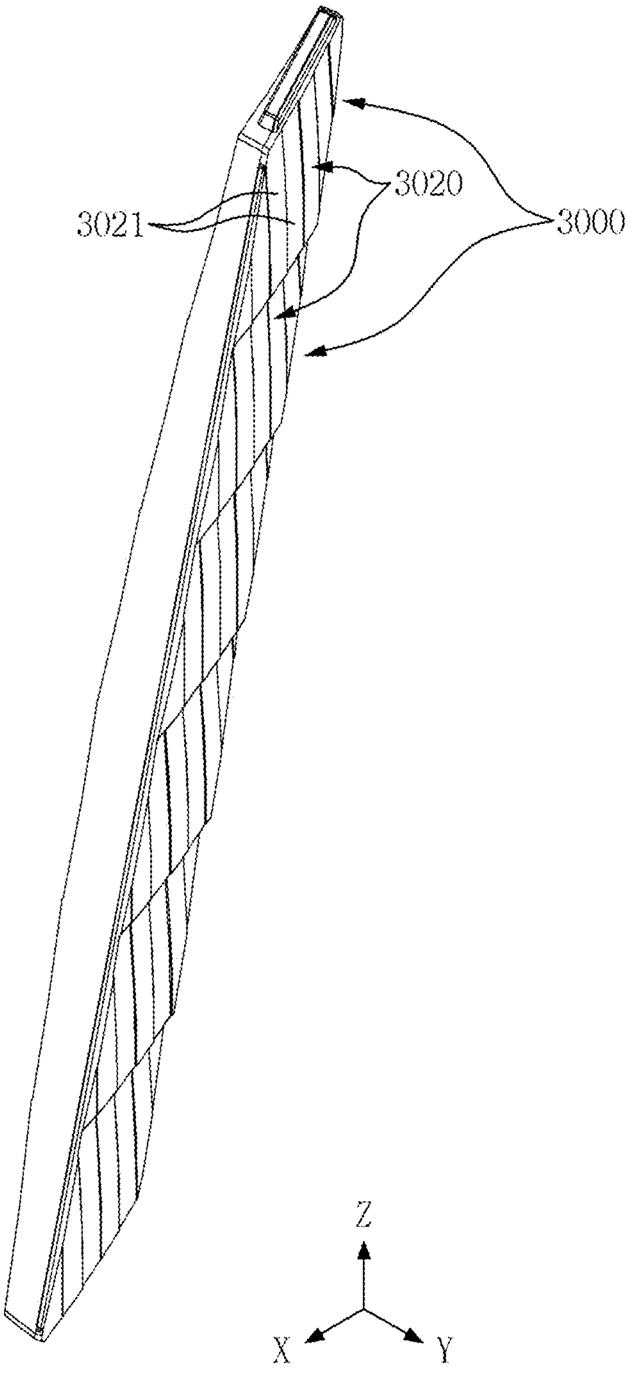
FIGS. 17 and 18 are perspective views showing a plurality of optical lenses according to an embodiment of the present disclosure.
Figure 18:
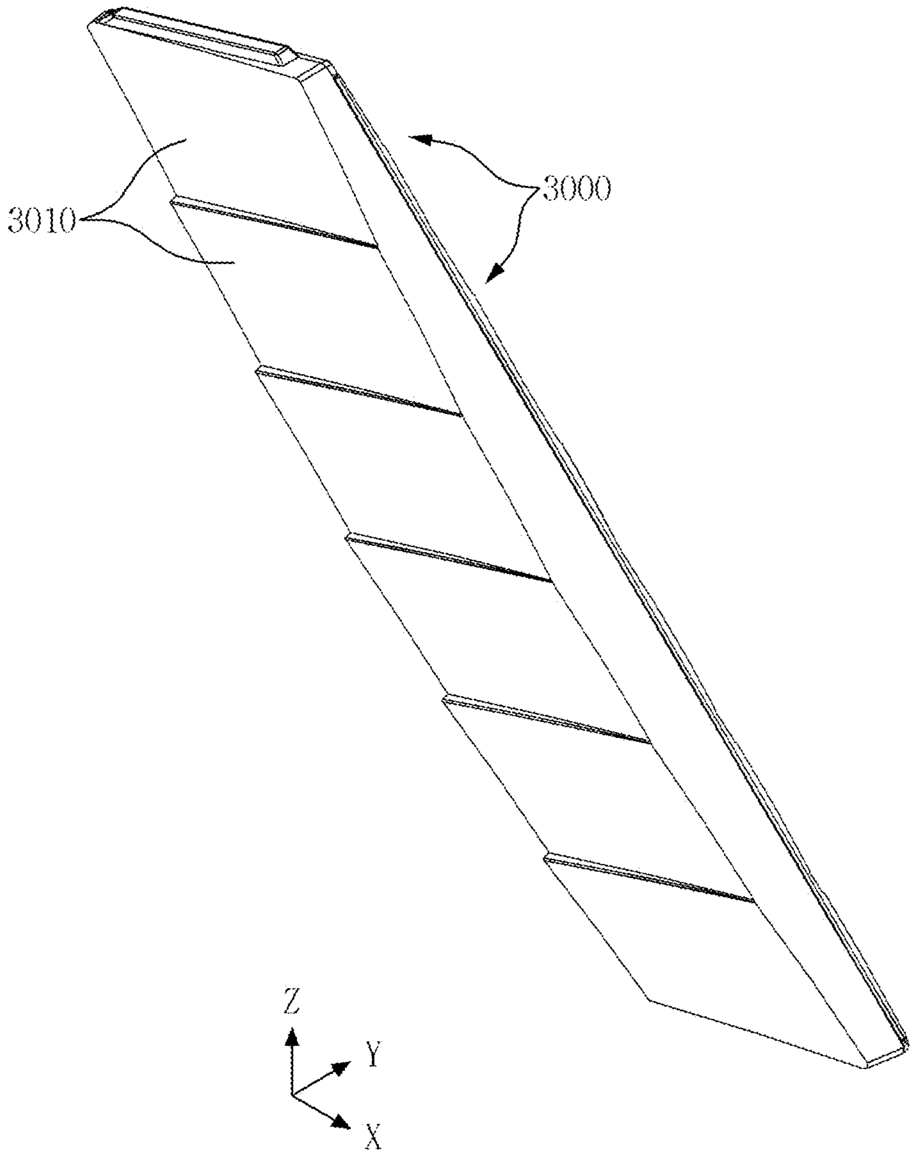

FIG. 17 is a perspective view illustrating a plurality of optical lenses according to an embodiment of the present disclosure. Referring to FIGS. 17 and 18, the plurality of optical lenses 3000 may be integrally formed with one another while being arranged in the vertical direction, in a similar manner as the plurality of light guiding lenses 2000. The plurality of optical lenses 3000 may be arranged along the vertical direction such that the center positions thereof do not overlap one another in the vertical direction and thus may be disposed closer to one side along the left-right direction gradually as they go upwardly or downwardly in the similar manner.

In an embodiment of the present disclosure, a case in which each of the plurality of optical lenses 3000 is formed such that the other side thereof in the left-right direction is disposed in front of one side in the left-right direction will be described by way of example. Thus, the plurality of optical lenses 3000 may be arranged along the body line of the vehicle in a similar manner as the plurality of light sources 1000 and the plurality of light guiding lenses 2000.

In each of the plurality of optical lenses 3000, the light incident on the light receiving surface 3010 may be emitted through the light emission surface 3020. The light emission surface 3020 of each of the plurality of optical lenses 3000 may include or be composed of a plurality of facets 3021 to improve an appearance image so that the aesthetics may be improved and the light path may be more easily controlled.

In an embodiment of the present disclosure, a case in which the light emission surface 3020 is composed of the plurality of facets 3021 will be described by way of example. However, this configuration is merely an example for helping understanding the present disclosure, and the present disclosure is not limited thereto. In each of the plurality of optical lenses 3000, at least one of the light receiving surface 3010 and the light emission surface 3020 may be composed of the plurality of facets.

As described above, the light receiving surface 3010 of each of the plurality of optical lenses 3000 may be formed to have a concave shape as shown in FIG. 6, so that a single focus may be formed by the light guiding lens and the optical lens corresponding to each other among the plurality of light guiding lenses 2000 and the plurality of optical lenses 3000. Additionally or alternatively, the entirety of the arrangement of the plurality of optical lenses 3000 may be formed to be convex rearwardly.

As described above, in the lamp 1 for a vehicle according to the present disclosure, the formation angle of the edge portion E of each of the plurality of light guiding lenses 2000 may be varied depending on the vertical position of each of the plurality of light guiding lenses 2000 arranged in the vertical direction. Thus, even when the positions in the front-rear direction of the plurality of light guiding lenses 2000 are different from one another, the cut-off line CL of the beam pattern formed by the light emitted from each of the plurality of light guiding lenses 2000 may entirely extend in parallel to or coincide with the horizontal line S, thereby preventing glare from occurring to the driver of the vehicle in front of the vehicle having the lamp 1 for a vehicle according to the present disclosure or deterioration of the field of view in front thereof.

In concluding the detailed description, those skilled in the art will appreciate that variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A lamp for a vehicle, comprising:

a plurality of light sources arranged in a vertical direction; and a plurality of light guiding lenses respectively disposed in front of the plurality of light sources and arranged in an arrangement direction of the plurality of light sources, wherein each of the plurality of light guiding lenses includes:

a light receiving portion to which light emitted from a corresponding light source among the plurality of light sources is incident;

a light emission portion disposed in front of the light receiving portion so as to emit the light incident thereto from the light receiving portion; and a shield portion including an edge portion disposed at a rear focus of the light emission portion, wherein the edge portion extends substantially perpendicular to a front-rear direction of the lamp and is configured to obstruct a portion of the light from being directed to the light emission portion, wherein the edge portion of at least one light guiding lens among the plurality of light guiding lenses and the edge portion of at least one other light guiding lens among the plurality of light guiding lenses are extended in different angles with respect to a horizonal line that is lateral to the lamp, wherein the plurality of light guiding lenses are arranged along the vertical direction such that positions thereof are disposed closer to one side of the lamp in a left-right direction progressively as they ascend, wherein the plurality of light guiding lenses include:

a first light guiding lens;

a second light guiding lens disposed on top of the first light guiding lens; and a third light guiding lens disposed under the first light guiding lens, and wherein the edge portions of the second light guiding lens and the third light guiding lens extend in an inclined manner in opposite directions with respect to each other.

2. The lamp for the vehicle of claim 1, wherein the edge portion of the at least one light guiding lens extends in parallel to the horizontal line, and the edge portion of the at least one other light guiding lens extends in an inclined manner at a predetermined angle with respect to the horizontal line.

3. The lamp for the vehicle of claim 1, wherein the edge portion of the first light guiding lens extends in parallel with the horizontal line.

4. The lamp for the vehicle of claim 1, wherein each of the second light guiding lens and the third light guiding lens has both opposing ends in the left-right direction of the edge portion, wherein one of the both opposing ends is disposed closer to the first light guiding lens than the other, and wherein one of the both opposing ends has a higher vertical level than the other.

5. The lamp for the vehicle of claim 1, wherein as each of the second light guiding lens and the third light guiding lens is spaced from the first light guiding lens in the left-right direction by a greater spacing, the edge portion thereof extends in an inclined manner at a greater angle with respect to a reference line parallel to the horizontal line.

6. The lamp for the vehicle of claim 1, further comprising:

a plurality of optical lenses respectively disposed in front of the plurality of light guiding lenses and arranged in the arrangement direction of the plurality of light sources, wherein each of the plurality of light guiding lenses and each of the plurality of optical lenses corresponding to each other have a common focus.

7. The lamp for the vehicle of claim 6, wherein the common focus is formed by the light emission portion of the light guiding lens and a light receiving surface of the optical lens corresponding to each other.

8. A lamp for a vehicle, comprising:

a plurality of light sources arranged in a vertical direction; and a plurality of light guiding lenses respectively disposed in front of the plurality of light sources and arranged in an arrangement direction of the plurality of light sources, wherein each of the plurality of light guiding lenses includes:

a light receiving portion to which light emitted from a corresponding light source among the plurality of light sources is incident;

a light emission portion disposed in front of the light receiving portion so as to emit the light incident thereto from the light receiving portion; and a shield portion including an edge portion disposed at a rear focus of the light emission portion, wherein the edge portion extends substantially perpendicular to a front-rear direction of the lamp and is configured to obstruct a portion of the light from being directed to the light emission portion, wherein the edge portion of at least one light guiding lens among the plurality of light guiding lenses and the edge portion of at least one other light guiding lens among the plurality of light guiding lenses are extended in different angles with respect to a horizonal line that is lateral to the lamp, wherein the plurality of light guiding lenses are arranged along the vertical direction such that positions thereof are disposed closer to one side of the lamp in a left-right direction progressively as they ascend, wherein the plurality of light guiding lenses include:

a first light guiding lens;

a second light guiding lens disposed on top of the first light guiding lens; and a third light guiding lens disposed under the first light guiding lens, and wherein as each of the second light guiding lens and the third light guiding lens is spaced from the first light guiding lens in the left-right direction by a greater spacing, the edge portion thereof extends in an inclined manner at a greater angle with respect to a reference line parallel to the horizontal line.

9. A lamp for a vehicle, comprising:

a plurality of light sources arranged in a vertical direction;

a plurality of light guiding lenses respectively disposed in front of the plurality of light sources and arranged in an arrangement direction of the plurality of light sources; and a plurality of optical lenses respectively disposed in front of the plurality of light guiding lenses and arranged in the arrangement direction of the plurality of light sources, wherein each of the plurality of light guiding lenses includes:

a light receiving portion to which light emitted from a corresponding light source among the plurality of light sources is incident;

a light emission portion disposed in front of the light receiving portion so as to emit the light incident thereto from the light receiving portion; and a shield portion including an edge portion disposed at a rear focus of the light emission portion, wherein the edge portion extends substantially perpendicular to a front-rear direction of the lamp and is configured to obstruct a portion of the light from being directed to the light emission portion, wherein the edge portion of at least one light guiding lens among the plurality of light guiding lenses and the edge portion of at least one other light guiding lens among the plurality of light guiding lenses are extended in different angles with respect to a horizonal line that is lateral to the lamp, wherein each of the plurality of light guiding lenses and each of the plurality of optical lenses corresponding to each other have a common focus, and wherein the common focus is formed by the light emission portion of the light guiding lens and a light receiving surface of the optical lens corresponding to each other.

* * * * *